Oct. 19, 1943.  G. V. A. GUSTAFSSON ET AL  2,331,904
GEOPHYSICAL INSTRUMENT
Filed Feb. 3, 1942   2 Sheets-Sheet 1

Inventors
G. V. A. Gustafsson
J. D. Malmqvist
By: Stevens and Davis
Attorneys

Inventors:
G. V. A. Gustafsson
J. D. Malmqvist
By: Stevens and Davis
Attorneys.

Patented Oct. 19, 1943

2,331,904

UNITED STATES PATENT OFFICE 2,331,904

GEOPHYSICAL INSTRUMENT

Gotthard Viktor Arnold Gustafsson, Stockholm, and Johan David Malmqvist, Boliden, Sweden Application February 3, 1942, Serial No. 429,432
In Sweden January 27, 1941

5 Claims. (Cl. 265—1.4)

The present invention relates to geophysical instruments such as gravimeters, seismographs, geophones and magnetometers.

The use of geophysical methods and instruments, especially during the last decade, have become of an ever increasing importance for searching out and determining the extensiveness of subterranean deposits such as deposits of ore, salts and oil. There is a tendency to develop a greater sensibility in the instruments in order to be able to determine both small deposits and deposits located on great depths.

The main object of the present invention is the provision of apparatus of the said kind which possess a high sensibility.

Broadly spoken our invention consists in the provision in geophysical instruments comprising a counterbalanced movable body or weight of means producing two pushing forces of the same size acting upon the movable body from opposite directions in a plane laid perpendicularly to the direction in which the said body is free to move.

Other objects will be described later in the specification.

In order better to explain the present invention and the principle underlying it a short description of the arrangement of some of the principal parts of said known instruments and the mode of applying the invention thereto shall be given below.

The main portion of such a known instrument consists of a movable body the weight of which has been counterbalanced by substantially vertically directed forces. The movable body is usually suspended from a spring device (which may consist of a spiral spring, of a torsion spring, or of one or more flat springs) or is held in any other suitable way. Gravimeters are used for measuring the acceleration due to gravity by determining the position of the movable body, and thus by determining the variations in said position a measurement will be obtained of the variations in the acceleration due to gravity.

It is possible to increase the sensibility of an instrument of this kind by using relatively long or weak suspension means for counterbalancing the movable body. This means, however, that the instrument will need more space and be more sensible to changes in temperature. Therefore it is preferable to make the instrument more compact by using short suspension springs.

If relatively short suspension springs be used the variations in the position of the movable body at small variations in the magnitude of the gravity, however, will be very small. It is, therefore, of great importance to be able to increase the changes in its position within the instrument to which the movable body will be subjected when the gravimeter is moved from one location to another where the gravity has a different value.

Now in order to attain a magnifying effect according to the present invention the movable body is subjected to the action of two opposite forces of the same size which are so positioned that in a predetermined zero position of the movable body they do not affect said position but that in every other position occupied by said body they will act upon the body in such a direction as to tend to carry it further away from said zero position and thus to increase its dislocation.

This pair of forces is so positioned that the two pushing forces being approximately of the same size act upon the movable body in a direction perpendicularly to the direction in which the body is free to move. Thus, if the construction of the instrument is such that the movable body is free to move vertically the pair of forces will have to act in horizontal directions. If the body being suspended from a torsion-spring with or without a bifilar suspension (suspension in two threads) is free to make a motion of rotation the pair of forces will have to act in directions perpendicularly to the direction in which the places of application of the forces acting on the body are moving.

The invention will be more fully described and explained with reference to the accompanying drawings in which Fig. 1 is a diagrammatic view of an instrument of the kind referred to where the movable body is free to move vertically.

Figure 1:
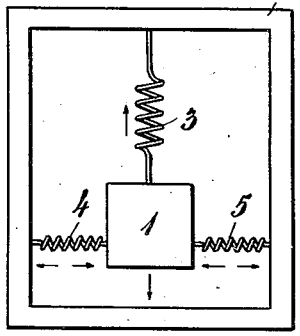
Figure 3:
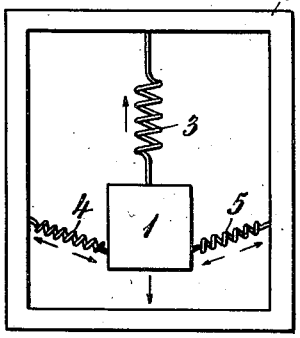
Fig. 3 is the same view as Fig. 1 but with the movable body in another position.
Figure 2:
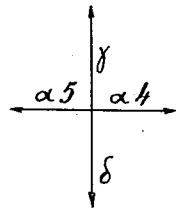
Fig. 2 is a diagram of the acting forces of Fig. 1.
Figure 4:
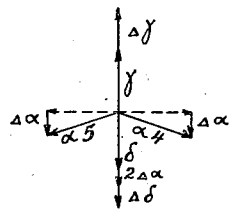
Fig. 4 is a diagram of the acting forces of Fig. 3.

In Fig. 1 the vertically movable weight or main body 1 is suspended from the support 2 by the spring 3 acting in a vertical direction. The two compression springs 4 and 5 are pressing against the movable body from opposite directions. In the zero position of the body as shown in Fig. 1 the springs 4 and 5 act horizontally and the position of the movable body will not be influenced by these horizontally directed forces acting thereupon as their resultant will be zero. The forces acting upon the movable body 1 in its zero position as viewed in Fig. 1 are shown in Fig. 2 where $\delta$ in the force of gravity acting upon the body, $\gamma$ is the reaction force produced in the suspension spring acting in opposite direction thereto and $\alpha 4$ and $\alpha 5$ the two pushing forces produced by the springs 4 and 5. If the instrument is moved to a location where the gravity has a higher value the force of gravity acting upon the movable body 1 will increase and the system will occupy a new position of equilibrium of the type shown in Figures 3 and 4. In this case there will be added to the downwardly pulling force $\delta$ not only the force representing the increase in the force of gravity $\Delta\delta$ but also a force $2\Delta\alpha$ which is the sum of the vertically directed components of the two forces produced by the compression springs 4 and 5. Due to this added force $2\Delta\alpha$ the movement of the movable body for a certain change in gravity will be comparatively much greater than if there were no pushing springs. The magnifying effect on the movement of the movable body may be given by the expression $$\frac{\Delta\delta+2\Delta\alpha}{\Delta\delta}$$

Figure 5:
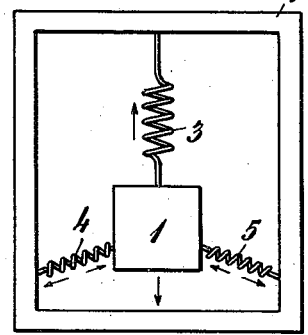
Fig. 5 is a diagrammatic view of the same apparatus as Fig. 3 in another position.
Figure 6:
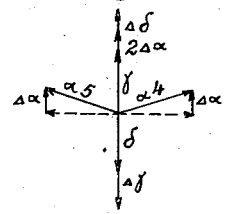
Fig. 6 is a diagram of the acting forces of Fig. 5.

As the magnitude of $\Delta\alpha$ depends on the forces produced by the springs 4 and 5 the magnification of the movement of the movable body may theoretically be increased unlimitedly till the equilibrium becomes instable. In a similar way a magnified upward movement will result if the instrument is moved to a place where the gravity is smaller as has been shown in Figures 5 and 6.

In these figures the acting pair of forces have been shown as produced by helical springs but of course other resilient and elastic means may also be used.

In arranging the instruments according to the Figs. 1–10 the advantage is gained that the action of the two opposite forces is symmetric around the zero position of the movable body. At measurements with the instruments thus the same accuracy will be obtained either the location is one where the gravity is higher or one where it is lower than at that location where the movable body is in its zero position.

Figure 7:
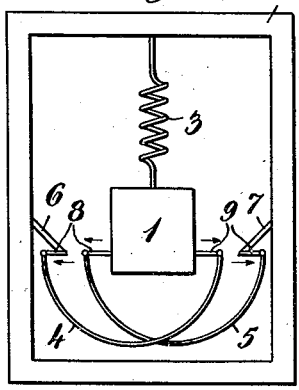
Fig. 7 is a diagrammatic view of another form of an apparatus of the kind referred to where the movable body is free to move vertically.

Fig. 7 shows the use of curved springs 4 and 5. In order to fasten the springs 4 and 5 to the support use has been made of fastening members 6 and 7. The connections between the springs and these fastening members and/or between the springs and the movable body may consist of weak pulling members 8 and 9.

The present invention is especially useful in such gravimeters where at every measurement the movable body is brought back to zero position by applying an additional variable vertical force which can be produced by magnetic, electrostatic or electromagnetic means causing attraction or repulsion or by means of an added elastic force such as a controlled spring device.

In thus bringing back the movable body to its zero position in which the pair of forces (produced by the springs 4 and 5) act in a horizontal direction and wherein no vertical component of the forces produced by the springs 4 and 5 exists the body will be subjected only to the influence of gravity and the vertical suspension force together with the variable added force. Elastic deformations of or changes in the springs 4 and 5 due to changes in temperature will be without any effect on the zero position of the movable body.

Figure 8:
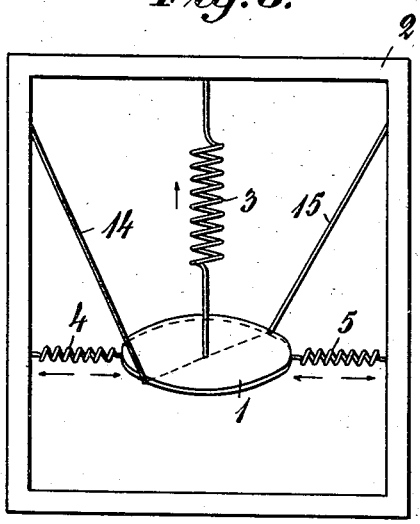
Fig. 8 is a diagrammatic view of still another form of the apparatus referred to where the movable body is free to make a motion of rotation.
Figure 9:
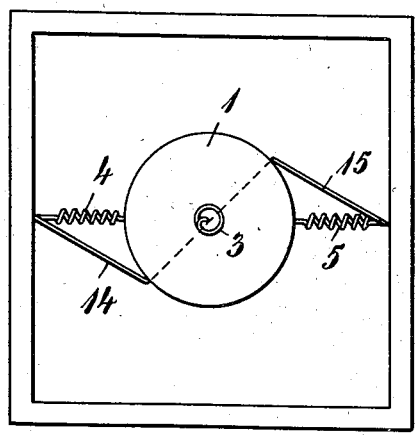
Fig. 9 is a plan of the apparatus shown in Fig. 8.

This invention may of course be applied to rotating systems (gravimeters) such as bifilar gravimeters. An arrangement according to this system is shown in Figures 8 and 9 where changes in gravity will cause the system to rotate about a vertical axis. The two suspension threads are 14 and 15. By the action of two pushing springs 4 and 5 upon the rotatable body the angle of rotation will be magnified in the same way as by linear movement of the body.

At least it may be observed that a system according to the present invention though it occupies very little space nevertheless possesses a long period of oscillation why the measurement of the force of gravity can be effected with great facility even though the system may be subjected to vibrations. This quality of the system makes it especially useful for seismographs and other instruments of like character. In such cases the problem is to determine small but rapid changes in the acceleration of gravity.

This invention may be useful with most types of gravimeters. Thus the device may be mounted in gravimeters where the position of the movable body is determined by electrical means viz. by measuring of a resistance, a capacity, or an inductance or by optical means such as microscopes or by interference measurement.

Figure 10:
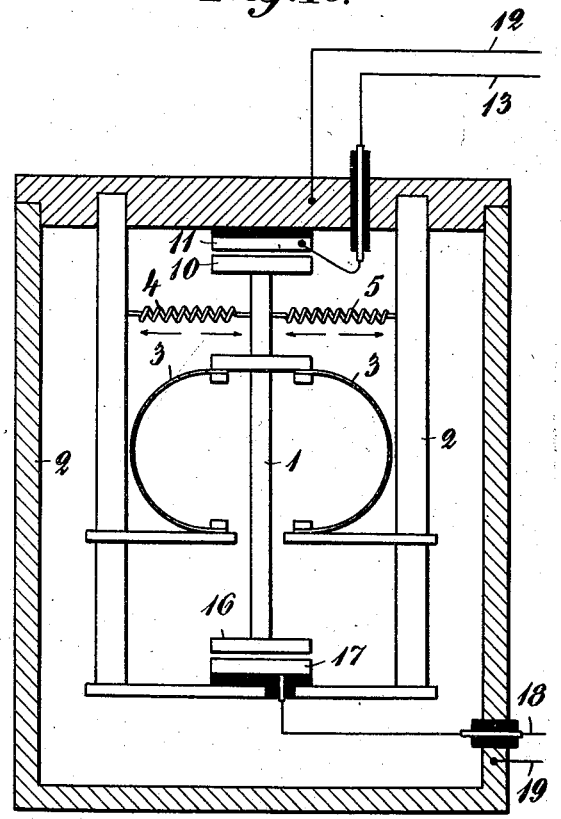
Fig. 10 is a somewhat diagrammatic view of an apparatus of the kind referred to having means for displacing the movable body and means for determining its position.

A preferred embodiment of the invention where several of the constructions of the movable body hereinbefore referred to are applied for effecting the registration of the position of the body and for returning the same after the measuring has been effected is shown in Fig. 10.

This figure shows the movable body 1 fastened to the support 2 by means of two flat springs 3. In order to diminish the stability of the movable body two horizontal springs 4 and 5 are fastened to the body and the support. In order to determine the position of the body the lower part thereof is shaped as a disc 16 located at a little distance from a disc 17 fixed to the support but insulated therefrom. By connecting the discs 16 and 17 to the wires 18 and 19 of a capacity measuring device the capacity may be determined and therewith the position of the body. In order to return the body to a predetermined zero position the body 1 at its upper part is formed as a disc 10 located opposite to a disc 11 fixed to the support but insulated therefrom. By applying a voltage between the discs 10 and 11 through the leads 12 and 13 the body can be returned to its zero position. By measuring the voltages required for returning the body to zero position the changes in gravity can be determined.

We claim:

1. In an instrument for geophysical prospecting, a mass, means for yieldingly counterbalancing the weight of said mass to permit movement thereof in response to variations in the value of gravity, means for applying equal and oppositely directed forces to said mass, said forces being applied perpendicularly to the direction of movement of said mass when the mass occupies its zero position, but exerting a component of force in the direction of movement of said mass upon departure of said mass from its zero position.

2. A device as claimed in claim 1, wherein the means acting upon the movable body which is free to move vertically consists of two compressed elastic members such as compression springs.

3. A device as claimed in claim 1 wherein the means acting upon the movable body which is free to move vertically consists of two compressed helical springs of the same size located on opposite sides of the movable body and fastened at their outer ends to the construction supporting the latter, said springs acting in opposite directions towards each other in a horizontal plane.

4. A device as claimed in claim 1 wherein the means acting upon the movable body which is free to move vertically consists of two curved springs of the same size provided on opposite sides of the movable body and fastened at their outer ends to the construction supporting the latter said springs acting in opposite diretcions towards each other in a horizontal plane.

5. A device as claimed in claim 1 having a movable counterbalanced body adapted to turn about a vertical axis wherein the points of application of the forces produced by the means effecting a pressure on the movable body are located opposite to each other the directions of the forces being substantially perpendicular to the directions in which said points of application are moving.

GOTTHARD VIKTOR.
ARNOLD GUSTAFFSSON.
JOHAN DAVID MALMQVIST.